(12) United States Patent
Wildfeuer

(10) Patent No.: US 6,298,055 B1
(45) Date of Patent: Oct. 2, 2001

(54) EARLY DETECTION OF IN-BAND SIGNALS IN A PACKET VOICE TRANSMITTER WITH REDUCED TRANSMISSION DELAY

(75) Inventor: Herbert M. Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/179,546

(22) Filed: Oct. 26, 1998

(51) Int. Cl.$^7$ .............................. H04L 12/66; H04L 12/50
(52) U.S. Cl. ............................................. 370/352; 370/384
(58) Field of Search .............................. 375/217; 370/384, 370/496, 517, 522, 523, 524, 525, 526, 352, 353, 354, 373, 377; 379/386, 351, 93.26

(56) References Cited

U.S. PATENT DOCUMENTS

| | | | |
|---|---|---|---|
| 5,666,357 | * | 9/1997 | Jangi ..................................... 370/345 |
| 5,719,931 | * | 2/1998 | Johnson ................................. 379/356 |
| 5,978,676 | * | 11/1999 | Guridi et al. ......................... 455/426 |

* cited by examiner

Primary Examiner—Wellington Chin
Assistant Examiner—Brenda Pham
(74) Attorney, Agent, or Firm—Marger Johnson & McCollom P.C.

(57) ABSTRACT

A packet voice transmitter and method of transmitting digital audio signals are disclosed that detect and alter transmission processing for in-band signals such as DTMF signals. The present invention allows a digital audio data stream to be sent without delay when in-band signals are not present by detecting the possible presence of in-band signals early, i.e., before an entire in-band signal symbol has been received. In one embodiment, a DTMF signature detector 58 operates in parallel with a voice encoder 56 on a digital audio data stream 20. If a frame from data stream 20 resembles a leading portion of a DTMF signal, DTMF signal detection manager 60 shifts encoded audio data frames from encoded audio data stream 70 into a frame delay buffer 66 while further frames are examined for DTMF signal consistency. If a complete DTMF signal is received, buffer 66 is flushed and a DTMF signal is transmitted out-of-band in a separate packet. If a potential DTMF signal turns out to be a false alarm, frames delayed in buffer 66 are supplied to packetizer 62 for transmission. As long as no potential DTMF signals are detected, encoded audio data stream 70 is allowed to proceed directly from voice encoder 56 to packetizer 62 without delay.

22 Claims, 6 Drawing Sheets

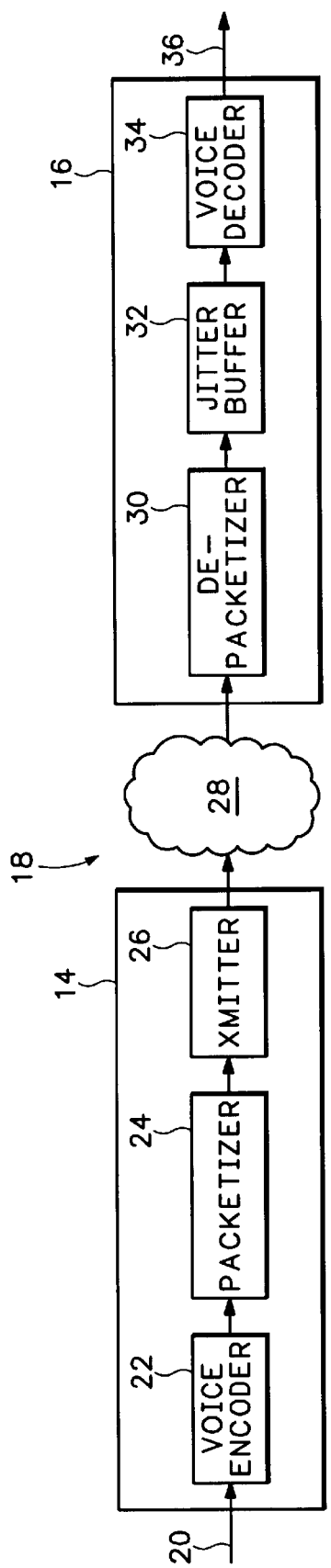
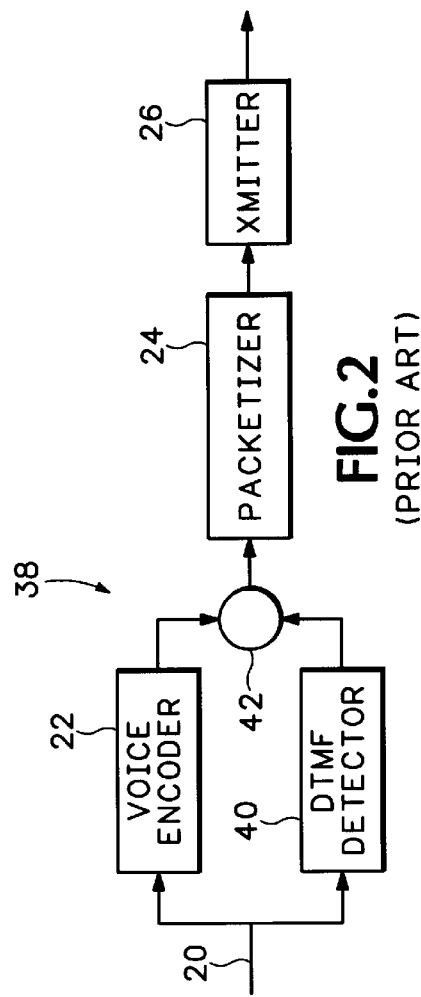
FIG. 1 (PRIOR ART)
FIG. 2 (PRIOR ART)

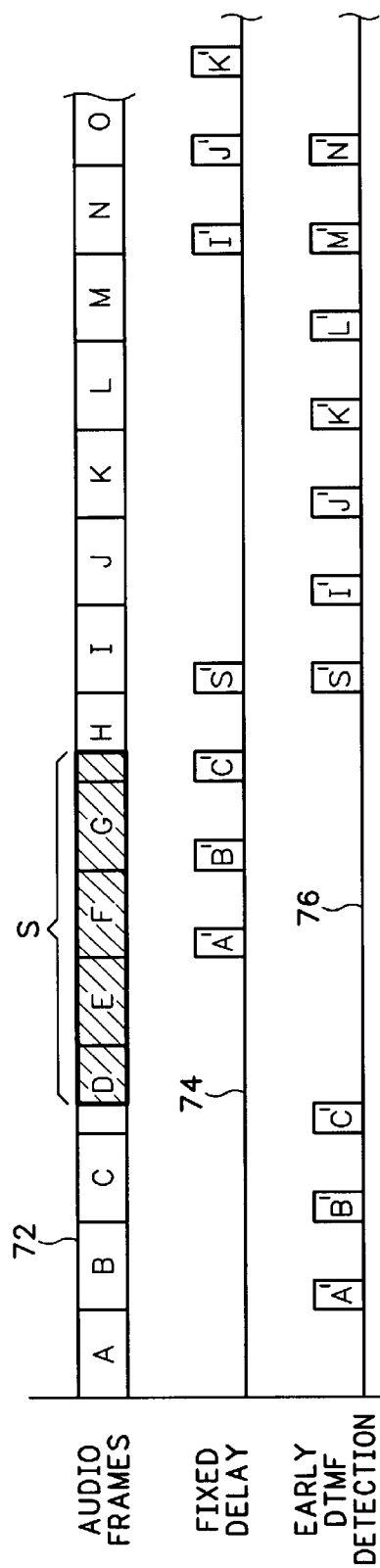
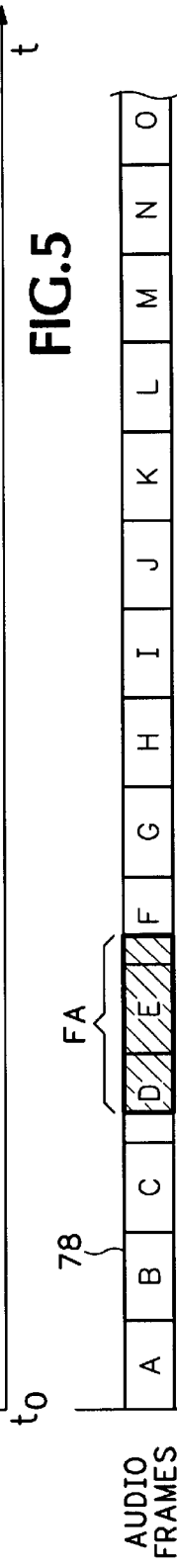
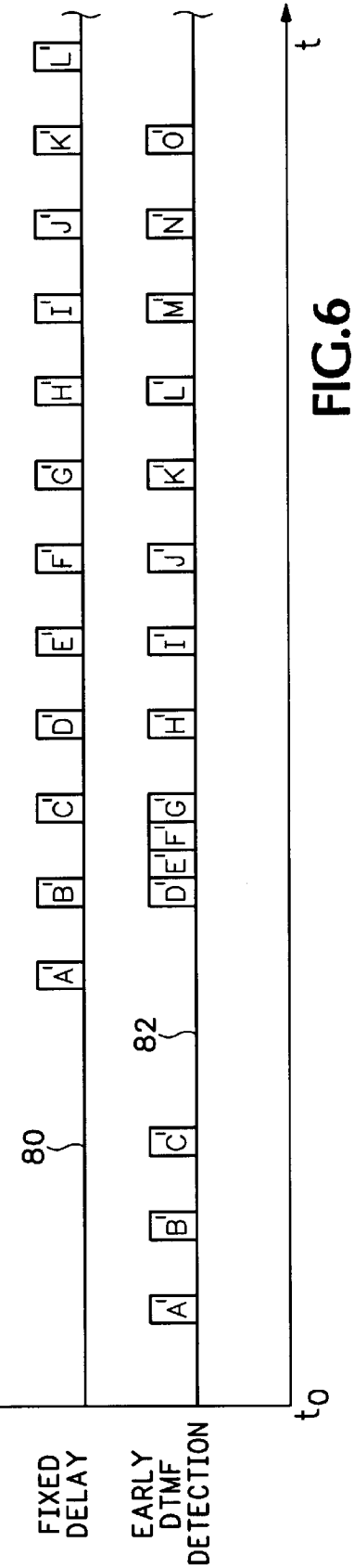
FIG.5
FIG.6

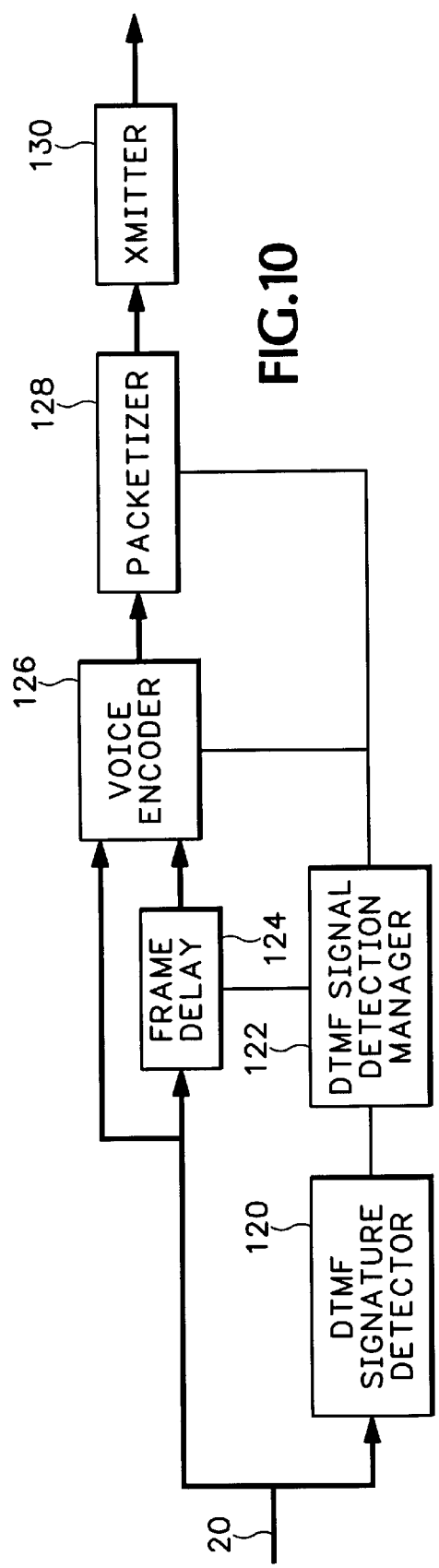

EARLY DETECTION OF IN-BAND SIGNALS IN A PACKET VOICE TRANSMITTER WITH REDUCED TRANSMISSION DELAY

FIELD OF THE INVENTION

This invention pertains generally to packet telephony methods and systems, and more particularly to packet telephony methods and systems that receive in-band signaling and employ low bit-rate encoders.

BACKGROUND OF THE INVENTION

Packet telephony involves the transmission of audio signals in discrete blocks, or packets, of digital data. FIG. 1 depicts a typical prior art packet telephony communication path 18. Packet telephony transmitter 14 converts a digitized audio stream 20, e.g., audio sampled at 8 kHz and quantized at 8 bits/sample, into packets. Transmitter 14 places these packets onto packet network 28, which routes the packets to packet telephony receiver 16. Receiver 16 converts packet data back into a continuous digital audio stream 36 which resembles input audio stream 20. Transmitter 14 and receiver 16 typically employ a codec (a compression/decompression algorithm) to reduce the communication bandwidth required for path 18 on packet network 28.

A basic packet voice transmitter 14 includes a voice encoder 22, a packetizer 24, and a transmitter 26. Voice encoder 22 implements the compression half of a codec, compressing audio stream 20 to a lower bit-rate. Packetizer 24 accepts compressed voice data from encoder 22 and formats the data into packets for transmission. Transmitter 26 places voice packets from packetizer 24 onto network 28.

Receiver 16 reverses the process utilized by transmitter 14. Depacketizer 30 accepts packets from network 28. Jitter buffer 32 buffers received data frames and outputs them to voice decoder 34 in an orderly manner. Voice decoder 34 implements the decompression half of the codec employed by voice encoder 22.

Low bit-rate voice codecs used in a packet voice encoder/decoder pair 22, 34 exploit physiological limitations on human hearing ability in order to reduce bit rate. One such human limitation is termed the spectral masking effect, i.e., high energy sound at one frequency masks lower-energy sound at nearby frequencies in the human auditory system. A codec may choose to ignore potentially masked sounds when coding, since a human will be unable to hear them even if they were faithfully reproduced. Low bit-rate codecs typically also model the bandpass filter arrangement of the human auditory system, including the frequency dependence of our auditory perception, in allocating bits to different portions of a signal. In essence, low bit rate encoding involves many decisions to throw away actual audio information that is undetectable or only marginally detectable by a human.

Because it is optimized for humans, voice encoding can produce undesirable effects if the audio signal being encoded is not meant for human hearing. Computer modem and facsimile audio signals are examples of such signals; both can be badly distorted by voice encoding. Modems and facsimile machines employ in-band signaling, i.e., they utilize the audio channel of a telephony connection to convey data to a non-human receiver. However, modem and facsimile traffic do not "share" a voice line with a human speaker. Packet telephony systems can therefore detect such in-band traffic during call connection and switch it to a higher bandwidth, non-voice encoding channel.

Other types of in-band signals share a voice channel with a human speaker. Most common among these are the DTMF (dual-tone multi-frequency) in-band signals generated by a common 12-button telephone keypad. Voice mail, paging, automated information retrieval, and remote control systems are among the wide variety of automated telephony receivers that rely on DTMF in-band control signals keyed in by a human speaker.

Voice encoding/decoding of DTMF signals can render these signals unrecognizable to an automated DTMF receiver. More sophisticated packet telephony systems are capable of detecting DTMF in an input audio data stream in parallel with voice encoding. FIG. 2 depicts a parallel voice-encoding/DTMF detector packet telephony transmitter 38. Transmitter 38 operates a DTMF in-band signal detector 40 on uncompressed audio data stream 20, in parallel with voice encoder 22. If speech is present in data stream 20, packetizer 24 will be supplied with a voice-encoded signal from encoder 22. If a DTMF signal appears in data stream 20, the DTMF signal, rather than the voice-encoded signal, is supplied separately to packetizer 24. This system allows DTMF signals to effectively bypass the voice codec, thereby avoiding DTMF signal distortion.

SUMMARY OF THE INVENTION

Although a parallel voice-encoding/DTMF detector packet telephony transmitter 38 can avoid DTMF fidelity problems, this capability comes at the price of higher latency. The International Telecommunications Union (ITU) recommends that a valid DTMF signal be at least 40 ms in duration. During the 40 ms duration of a DTMF pulse, if a voice encoder is allowed to ship frames containing voice-compressed DTMF, the receiver may garble the DTMF signal, or identify two signals (a first voice-encoded signal and a second DTMF detector-generated signal). To avoid this problem, voice encoder 22 must delay all speech output by a fixed delay of at least 40 ms to allow DTMF detector 40 to detect valid DTMF samples. This delay allows the transmitter to switch smoothly from voice-encoding to DTMF transmission without causing confusion at the receiving end. Unfortunately, this same delay adds to the call latency perceived by voice callers utilizing a packet voice connection so-equipped.

Voice callers utilizing the present invention can enjoy reliable DTMF capability over a packet network, without suffering a fixed latency penalty due to DTMF recognition. The present invention avoids adding fixed latency by performing a preliminary DTMF detection-essentially, an early detection of potential DTMF signals based on a leading portion of a DTMF pulse. If recent audio data samples are consistent with a leading portion of a DTMF signal, the present invention delays encoded speech transmission while validating the presence or absence of a complete DTMF signal of the appropriate duration. If no potential in-band signal has been detected, voice-encoded frames are not held up. As most DTMF false alarms can be rejected within one frame of voice data, delay of true voice frames will occur relatively rarely, as opposed to the continuous delay found in prior art systems.

If a potential in-band signal is detected, the present invention delays voice frames in a buffer while it resolves the presence of an in-band signal. If an in-band signal of the proper duration is present, delayed voice frames are discarded from the buffer and an in-band signal is transmitted instead. If the potential in-band signal turns out to be a false alarm, delayed voice frames are immediately released from the buffer for transmission. The small amount of packet jitter caused by false alarm delays is easily handled by the receiver, which is designed to handle relatively large jitter present on a packet network. No degradation in speech quality should result from false alarms.

In one aspect of the present invention, a packet voice transmitter comprises a frame delay buffer, a frame-based voice encoder, an in-band signal signature detector, and an in-band signal detection manager. Voice data normally follows a first path through the transmitter, one that bypasses the frame delay buffer. The in-band signal detection manager can select a second voice data path that includes the frame delay buffer. The in-band signal detection manager relies on the in-band signal signature detector to notify it of potential in-band signals. The detection manager responds appropriately by controlling the data path and frame delay buffer.

In a further aspect of the invention, a method of transmitting digital audio signals is disclosed. Generally, this method comprises scanning an audio stream for consistency with a leading portion of an in-band signal, and upon detecting such a consistency, digitally delaying transmission of the audio stream while verifying the presence or absence of the in-band signal. Preferably, the audio stream is comprised of digital audio samples and the scanning process is digitally implemented. More preferably, scanning is synchronized with frames of digital audio samples as they are processed by a voice encoder.

BRIEF DESCRIPTION OF THE DRAWINGS

The invention may be best understood by reading the disclosure with reference to the following figures:

FIG. 1, which shows a block diagram of a prior art packet voice telephony system;

FIG. 2, which shows a prior art packet voice transmitter;

FIGS. 5 and 6, which compare packet transmission timelines for a fixed delay DTMF detection transmitter and a DTMF early detection transmitter;

FIGS. 8–10, which illustrate several alternate embodiments for a packet voice transmitter according to the present invention.

DETAILED DESCRIPTION OF THE PREFERRED EMBODIMENTS

The present invention generally applies to systems that convert digital or analog audio data streams containing in-band signals into real-time packet voice data. In particular, a data network telephony gateway benefits from the present invention. Such gateways generally handle conversion of audio data to and from a packet network in a two-way connection.

As used herein, a "frame" of data refers to a group of two or more samples representing a timeslice of a data stream. "Frames" and "packets" containing framed data are distinguishable in two general ways: packets contain headers required for packet transmission, and packets may contain multiple frames or additional information to be conveyed along with framed data. Many of the concepts in the present invention apply equally whether a frame has been packetized or not. For instance, a buffer that delays packets of framed data is still a "frame delay buffer."

DTMF Detection and Delay

Figure 3:
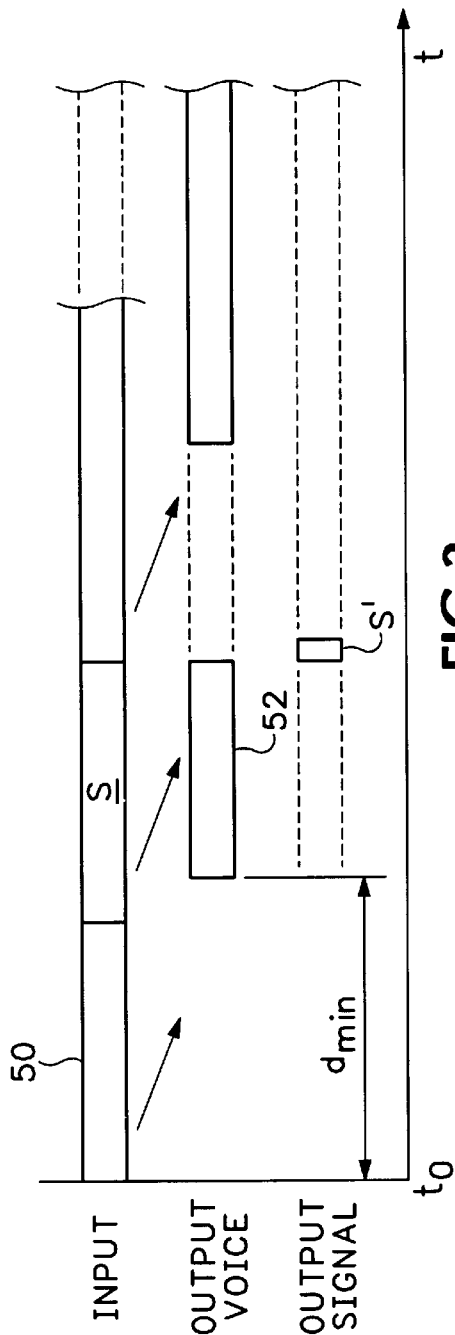
FIG. 3, which contains timing information for a prior art in-band signal detection transmitter.

FIG. 3 illustrates a transmit timeline for an input voice data stream 50 containing an embedded in-band signal S. Embedded signals, of minimum duration $d_{min}$ or greater, are to be detected in data stream 50 and removed for out-of-band transmission. Transmit voice data stream 52 is delayed by at least $d_{min}$, with reference to data stream 50, to allow adequate time for detection and removal of embedded signal S from input voice data stream 50 before embedded signal S reaches its in-band transmit time. In this example, embedded signal S is detected successfully prior to its in-band transit time, removed from transmit voice data stream 52, and a corresponding out-of-band signal S' is transmitted during the time slot left open in stream 52 by the removal of S from stream 50.

In a real-time conference, $d_{min}$ may contribute significantly to the overall delay perceived by the participants. Overall delays of greater than 250 ms rapidly become noticeable to participants over a two-way real-time connection. The prior art approach of FIG. 2 requires about 50 ms of fixed delay to provide DTMF capability, whether DTMF capability is actually used during a given conference or not. DTMF capability thus spends a significant portion of an allowable delay budget of 250 ms, a portion that could otherwise be used, e.g., to help compensate for variable delays observed at the receiving end of a transmit path.

DTMF Early Detection

Figure 4:
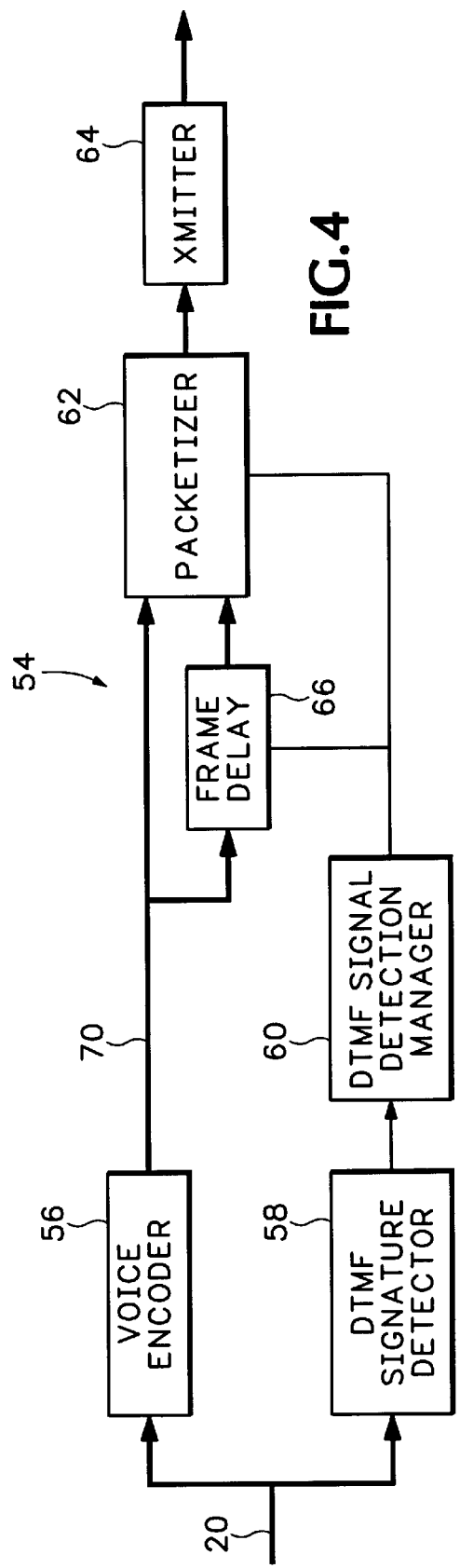
FIG. 4, which illustrates a packet voice transmitter according to one embodiment of the present invention.

The present invention allows the fixed delay $d_{min}$ to be removed from the primary voice data path of a packet voice transmitter. A first embodiment of a packet voice transmitter 54 according to the present invention is depicted in FIG. 4. A digitized audio stream 20 is supplied to voice encoder 56. Voice encoder 56 produces an encoded digital audio stream 70 which is available to both packetizer 62 and frame delay buffer 66. Packetizer 62 may alternately receive delayed frames from digital audio stream 70 through frame delay buffer 66. When packet voice transmitter 54 utilizes the direct path from voice encoder 56 to packetizer 62, no fixed delay is deliberately added to voice frames (beyond what is required for encoding) in order to enable DTMF detection.

Packet voice transmitter 54 operates a DTMF signature detector 58 roughly in parallel with voice encoder 56. Signature detector 58 classifies frames from digitized audio stream 20 as potential in-band signals or voice within the frame processing time of voice encoder 56. Early classification (i.e., before a valid in-band signal can be declared) allows encoded voice data 70 to proceed unimpeded to packetizer 62 if no potential in-band signal has been detected. If a potential in-band signal has been detected, DTMF signal detection manager 60 transfers encoded voice data 70 into frame delay buffer 66 while the presence or absence of an in-band signal is resolved.

Comparison of Fixed Delay and Early Detection Transmitters

FIG. 5 compares timelines for a prior art fixed delay in-band signal transmission approach and a transmission approach according to the invention. Input voice data stream 72 is divided into digital sample frames A, B, C, D . . . of equal length (e.g., 10 ms or 80 samples at 8 kHz). An in-band signal S, four frames in length, begins almost midway through frame D and ends in frame H. The object of both transmission approaches is to compress voice data stream 72, extract in-band signals from voice data stream 72 and relay them separately, and to transmit both compressed voice and signals in packets.

Timeline 74 shows how a system using fixed delay responds to input voice data stream 72. In-band signaling is asynchronous; almost always, a four-frame duration in-band signal will span five frames. Thus, a fixed delay system cannot know whether frame A is part of a valid in-band signal until frame E is processed by the DTMF detector. The fixed delay system waits until the end of frame E, and then transmits packet A' because a DTMF detection has not occurred. At the end of frame H and after packet C' has been transmitted, the DTMF detector declares a valid detection of signal S. Frames D–H are therefore not queued for transmission. A single out-of-band signal packet S' is created instead to relay the presence of in-band signal S to a receiver.

Timeline 76 shows how a system using early DTMF detection responds to input voice data stream 72. Each frame A, B, C, . . . is checked for consistency with a DTMF signature. As frame A fails the DTMF consistency check, packet A' is allowed to be transmitted immediately after its creation. Frames D–G pass the DTMF consistency check, and thus packets corresponding to these frames are held up. When frame H is processed, a valid DTMF detection is declared. Frames D–H are therefore not queued for transmission, and a single out-of-band signal packet S' is created instead. Frame I fails the DTMF consistency check, allowing packet I' to be transmitted immediately after its creation.

Early Detection and In-Band Signal False Alarms

For DTMF applications, early detection (e.g., based on the first 5 to 10 ms of a 40 ms pulse) is technologically feasible using known techniques such as tuned digital filters or discrete Fourier transform (DFT) spectral analysis. Applicable techniques generally detect signal strength at or near appropriate low/high band DTMF tone center frequency pairs (low band 697 Hz, 770 Hz, 852 Hz, and 941 Hz; high band 1209 Hz, 1336 Hz, 1477 Hz, 1633 Hz). Many techniques also check for the absence of signal strength at frequencies corresponding to the second harmonic of DTMF tone center frequencies, in order to reject speech or noise patterns that resemble DTMF signals at DTMF tone frequencies.

A relatively high initial false alarm rate generally must be tolerated in order to allow DTMF early detection. DTMF signal tolerances are stringent enough to challenge DTMF detectors having access a full 40 ms pulse, such that accurate detection decisions based only on a leading portion of a pulse will likely fail these tolerances. The ITU and Bellcore have published the following recommended tolerances for DTMF detection.

TABLE 1

DTMF Tolerances

| Specification | Mode | Tolerances |
|---|---|---|
| Frequency Tolerance | Accept | ±1.5% |
|  | Reject | ±3.5% |
| Signal Duration | Accept | ≧40 ms |
|  | Reject | ≦23 ms |
| Signal Interruption | Same Signal | ≦10 ms |
| Twist | Accept-Forward | ≦8 dB |
|  | Accept-Reverse | ≦4 dB |
| SNR | Detect | ≧23 dB |
| Signal Power Level | Detect | ≧−25 dBm |

Reliable early DTMF detection techniques preferably relax some of these tolerances, for instance, frequency rejection and twist, during early detection. For a 10 ms frame, false alarm rates for single-frame detection may therefore be set relatively high in order to ensure reliable early detection of true signals. However, false alarm rate quickly decreases for two-frame and three-frame early detection at this frame size.

FIG. 6 illustrates an input voice data stream 78 that contains no in-band signal. However, data stream 78 contains a 20 ms section FA that resembles a leading portion of a valid DTMF signal. A fixed delay transmitter properly rejects FA as being of improper duration, and thus transmits packets D', E', and F' as voice packets at their scheduled delayed times as shown on timeline 80.

A variable delay transmitter using early DTMF detection transmits packets according to timeline 82. An early DTMF signature detector triggers a false early detection on frame D, and continues this detection on frame E, responding to section FA of input voice data stream 78. The variable delay transmitter delays packets D' and E' during the false detection. False DTMF signature FA is finally rejected after frame F. When the false detection is rejected after frame F, packets D', E', and F' are queued for transmission.

Timelines 80 and 82 show that, even with a false alarm, early DTMF detection queues packets earlier than a fixed delay method. In a worst-case scenario, where a false alarm could not be rejected until the fourth frame, a single packet would be delayed equivalently to a fixed delay, while other delayed packets would still be transmitted earlier than with a fixed delay scheme.

False alarms due to early DTMF false detections are a source of packet jitter in an encoded voice packet stream. In FIG. 6, false alarm FA disturbs the orderly progression of packets along timeline 82, resulting in a transmission gap between packets C' and D', followed by a quick burst of packets D'–G'. A receiver playing these packets generally can handle such DTMF false alarm-generated jitter, which resembles packet transmission jitter that a receiver already compensates for.

Managing a DTMF Early Detection Transmitter

Figure 7:
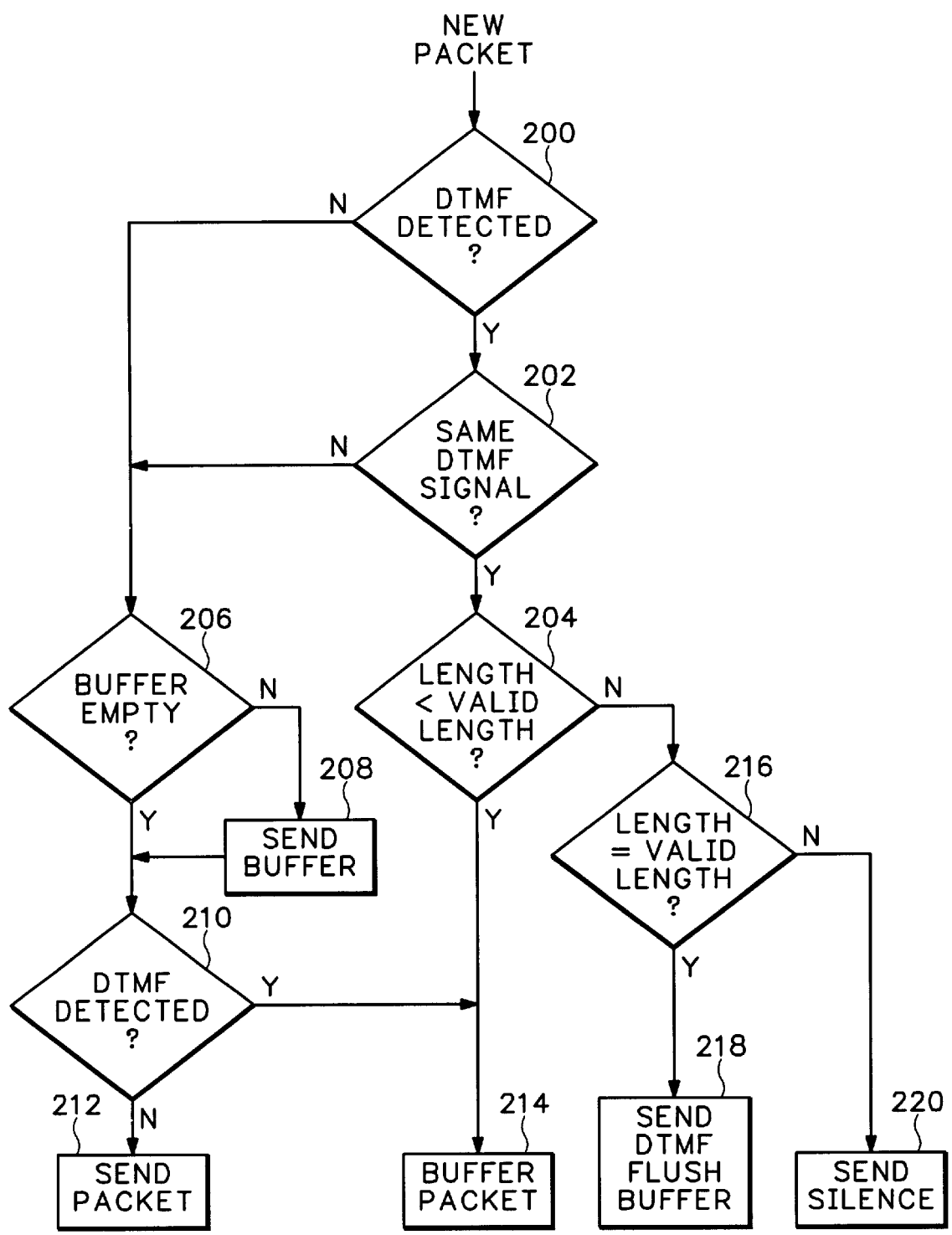
FIG. 7, which contains a decision flowchart for a DTMF signal detection manager useful with the present invention.

A DTMF signal detection manager 60 preferably orchestrates the tasks of controlling delay buffer 66 and coordination of packetizer 62 with two audio data paths. The flowchart of FIG. 7 maps one method of operation for DTMF signal detection manager 60. As each new voice frame (or packet) is produced, detection manager 60 checks the results of DTMF signature detector 58 for that frame or packet (decision block 200). If signature detector 58 has not detected a potential DTMF signature, manager 60 proceeds to decision block 206. If a potential DTMF signature has been detected, controller 60 (decision block 202) compares the indicated potential DTMF signal with the indication from the previous frames. If during the previous frame, no potential DTMF signal, or an inconsistent DTMF signal, was indicated, processing is transferred to decision block 206. Otherwise, processing is transferred to decision block 204.

Processing paths beginning with decision blocks 204 and 206 represent the two main logical paths for voice packet management. Decision block 206 is reached when either no potential DTMF signal or a new potential DTMF signal is detected. Decision block 204 is reached when a potential DTMF signal is detected on a second or subsequent frame. Whether a signal is the "same" signal as the prior frame preferably involves a somewhat loose decision. A first-frame detection, depending on the magnitude of the signal twist, may be based largely on a significant signal detected at or near one DTMF frequency. Such a detection may identify either the row or column of the button depressed by the signaler, but be ambiguous as to the exact button on that row or column depressed. In such case, any further resolution of the signal that is consistent with the first frame, e.g., a "same row" detection on a second frame where the first frame did not resolve the signal column, should be identified as the same signal.

When either no potential DTMF signal or a new potential DTMF signal is detected, manager 60 must perform two tasks. First, at decision block 206, manager 60 determines whether packets are currently being held in buffer 66. If so, these packets were delayed because of what is now known to be a false alarm, and they are queued for transmission in block 208. The second task the manager must perform is to either send or buffer the packet in block 210. If no potential DTMF signal is detected for the current frame, the current packet is transmitted in block 212. If a new potential DTMF signal has been detected, block 214 buffers the packet.

When a potential DTMF signal is detected on a second or subsequent frame, three processing paths are possible. Essentially, decision blocks 204 and 216 look at the detection length of a DTMF signature received over multiple frames. If the signature is consistent, but has yet to exist for a sufficient time to declare a DTMF detection, the current packet is buffered in block 214. If the signature reaches the minimum time required for a valid DTMF signal, it is transmitted out-of-band at block 218, and voice packets stored in buffer 66 are flushed (including the current packet), or replaced with silence packets. Finally, if a valid DTMF signal has already been detected and transmitted, but the in-band signal continues past the minimum duration, block 220 operates to send silence, instead of the current voice packet, during the remaining duration of the signal. Optionally, a DTMF out-of-band signal continuation packet could be sent at block 220.

Alternate DTMF Early Detection Transmitters

Figure 8:
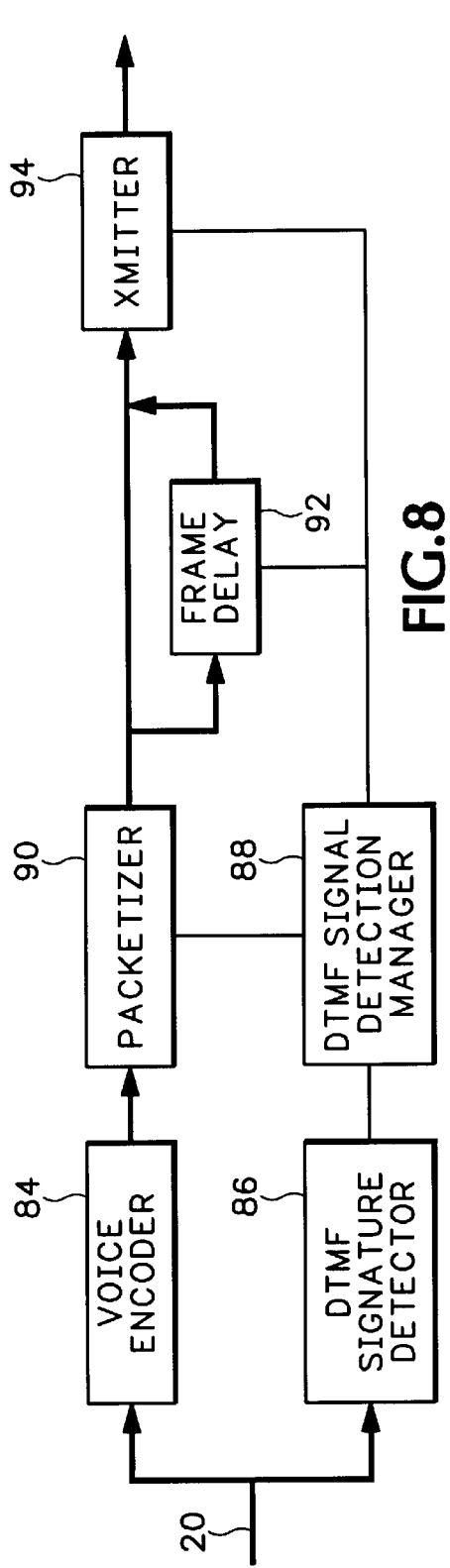
Figure 9:
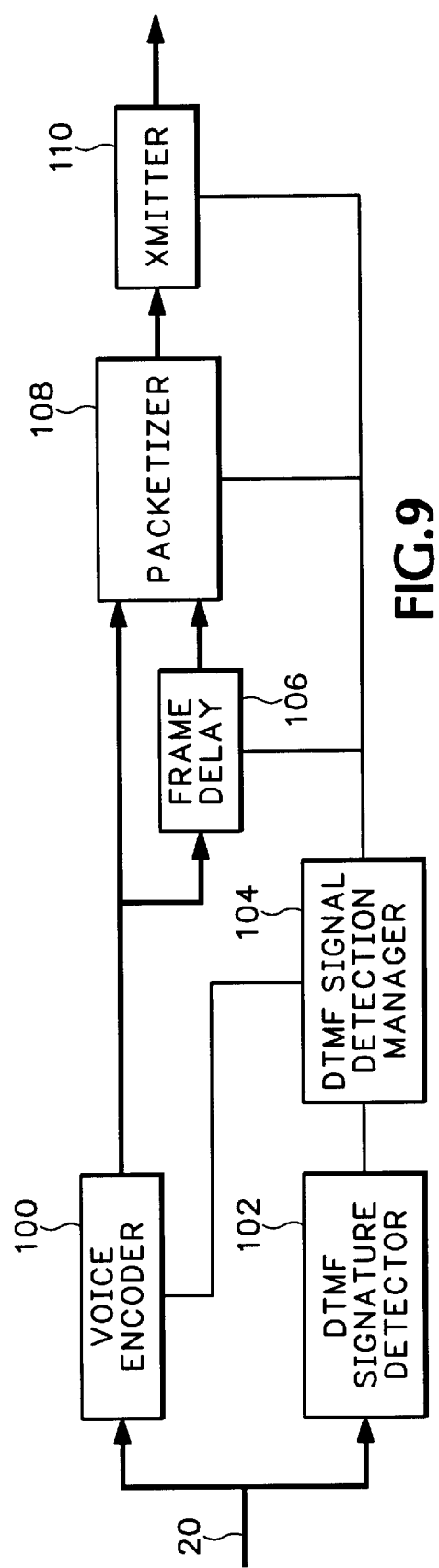

A variety of alternate transmitter configurations, other than the one depicted in FIG. 4, fall within the scope of the present invention. FIGS. 8, 9, and 10 illustrate three such embodiments.

FIG. 8 shows an embodiment with a delay buffer 92 placed between packetizer 90 and transmitter 94. In such an embodiment, packetizer 90 initially assumes all encoded voice frames from voice encoder 84 require packetization. DTMF signal detection manager 88 can delay packets prior to transmitter 94 if a potential DTMF signal is detected. One advantage of this embodiment is that packetization time (particularly if more than one frame is stored in a packet) provides further time for signature detector 86 to verify in-band signal presence before deciding to buffer a frame.

FIG. 9 shows an alternate embodiment in which voice encoder 100 and DTMF signal detection manager 104 communicate. In some circumstances (e.g., if manager 104 reaches decision block 216 in FIG. 7), encoded voice frames need not be buffered. This embodiment allows voice encoder 100 to work on other tasks when in-band signals are present instead of encoding frames that will be thrown away. Such capability may be advantageous, e.g., in systems where a single processor implements multiple functions and/or multiple voice channels.

FIG. 10 extends the embodiment of FIG. 9 by moving delay buffer 124 ahead of voice encoder 126 in the voice data path. In this embodiment, DTMF signature detector 120 actually runs before voice encoder 126 on input voice data stream 20. DTMF signal detection manager 122 then decides whether voice frames should be buffered in delay buffer 124, or processed immediately by voice encoder 126. A disadvantage of this embodiment may be bottlenecking at voice encoder 126 if a false alarm is declared and delay buffer 124 releases several frames of data to voice encoder 126. An advantage is that none of the frames of an in-band signal would be voice-encoded and then thrown away.

A DTMF signature detector need not be constrained to process a voice data stream using either the same frame structure as the voice encoder, or any frame structure at all. For instance, a signature detector that continuously feeds input data samples, as received, into a matched filter bank, can be used with the invention by synching signature detector output with the appropriate voice encoder frames. Although most systems using the present invention only have access to a digitized voice stream and thus must detect DTMF digitally, a DTMF signature detector that operates on an analog voice stream prior to digitization can also be used as long as it has the capability to produce early detection information.

Embodiments of the invention are intended to be compatible with other common prior art transmitter components. Many prior art transmitters detect silence intervals and turn off voice-encoded packet transmission during these intervals. Logic for packet control, due to either DTMF signal detection or silence detection, may be combined in a common packet control manager.

The particular method used to transmit DTMF-received signals is not critical to the present invention. Out-of-band signaling in a DTMF packet providing relative timing information, such as an RTP timestamp, is preferred. Alternately, DTMF could be transmitted in-band using uncompressed PCM samples, or attached as signal data to packets transmitting other information. It is preferred that the transmitter convey the length of an in-band signal to the receiver for faithful retransmission, although from a signaling perspective the minimum signal duration is all that is required. The transmitter may also choose to send "silence" packets in conjunction with DTMF out-of-band signaling, to indicate that no voice packets are missing from the data stream.

The invention has been described herein with reference to several illustrative embodiments. Although DTMF, as a predominant in-band signaling scheme, has been used in specific embodiments herein, the present invention is equally applicable to other in-band signaling techniques that use signals that cannot be completely received in a single frame. Such techniques include amplitude-modulated single-frequency signaling, frequency shift pulsing, and other multifrequency signaling schemes. The present invention may also incorporate some delay in all packets in order to provide reliable early detection, without requiring that every packet be delayed for the full duration of potential in-band signals. Other modifications to the disclosed embodiments will be obvious to those of ordinary skill in the art upon reading this disclosure, and are intended to fall within the scope of the invention as claimed.

What is claimed is:

1. A packet voice transmitter comprising:
    a frame delay buffer;
    a frame-based voice encoder incorporated into first and second voice data paths through said transmitter, said first data path bypassing said frame delay buffer and said second data path including said frame delay buffer;
    an in-band signal signature detector; and
    an in-band signal detection manager configured to select one of said first or second data paths and control operation of said frame delay buffer in response to the output of said in-band signal signature detector.

2. The packet voice transmitter of claim 1, wherein said in-band signal signature detector is a frame-based signature detector operating on common frames with said voice encoder.

3. The packet voice transmitter of claim 1, wherein said in-band signal signature detector detects dual-tone multifrequency signals.

4. The packet voice transmitter of claim 1, further comprising a packetizer that accepts voice-encoded frames from said frame-based voice encoder and assembles packets containing said voice-encoded frames for transmission.

5. The packet voice transmitter of claim 4, wherein said frame delay buffer accepts voice-encoded frames from said frame-based voice encoder, and wherein said packetizer accepts voice-encoded frames alternately from said frame delay buffer.

6. The packet voice transmitter of claim 4, wherein said frame delay buffer accepts packets from said packetizer, and provides an alternate source of packets for transmission by said transmitter.

7. The packet voice transmitter of claim 1, wherein said frame-based voice encoder and said in-band signal detector operate in parallel on voice data.

8. The packet voice transmitter of claim 1, wherein said in-band signal detection manager controls whether said frame-based voice encoder processes each frame of voice data.

9. The packet voice transmitter of claim 8, wherein said frame delay buffer holds frames of voice data prior to encoding of said frames by said voice encoder.

10. The packet voice transmitter of claim 1, wherein said frame delay buffer holds frames of voice data prior to encoding of said frames by said voice encoder.

11. The packet voice transmitter of claim 1, wherein said frame-based voice encoder and said in-band signal signature detector are implemented on a common microprocessor.

12. A packet voice transmitter comprising:
   a frame delay buffer;
   a frame-based voice encoder incorporated into first and second encoded voice data paths through said transmitter, said first data path bypassing said frame delay buffer and said second data path including said delay buffer;
   a packetizer incorporated into said first and second encoded voice data paths;
   a frame-based dual-tone multifrequency signal signature detector; and
   a dual-tone multifrequency signal detection manager configured to select one of said first or second encoded voice data paths and control operation of said frame delay buffer in response to the output of said in-band signal signature detector.

13. The packet voice transmitter of claim 12, wherein said dual-tone multifrequency signal detection manager communicates the presence of dual-tone multifrequency signals to said packetizer.

14. The packet voice transmitter of claim 13, wherein said packetizer packetizes dual-tone multifrequency signals as out-of-band signal packets.

15. A method of transmitting digital audio signals, said method comprising the steps of:
   encoding a first frame of digital audio samples, thereby producing a first audio-encoded frame;
   identifying a potential in-band signal when said first frame of digital audio samples is consistent with a sampled leading portion of an in-band signal;
   when a potential in-band signal is identified,
      holding said first audio-encoded frame, while scanning one or more additional frames of digital audio samples for consistency with a sampled second portion of said in-band signal; and
   queuing said first audio-encoded frame for packet transmission when no potential in-band signal is identified.

16. The method of claim 15, wherein when said scanning one or more additional frames step finds said one or more additional frames consistent with a complete in-band signal, discarding said first audio-encoded frame and queuing instead a signal corresponding to said in-band signal.

17. The method of claim 16, further comprising the step of, once a complete in-band signal has been detected, suspending said encoding step on additional frames of digital audio samples until a frame of samples inconsistent with said in-band signal is detected.

18. The method of claim 15, wherein when said scanning one or more additional frames step finds said one or more additional frames inconsistent with a complete in-band signal, queuing said first audio-encoded frame for packet transmission.

19. A method of transmitting digital audio signals, said method comprising the steps of:
   scanning a stream of digital audio samples for a sequence of samples consistent with a leading portion of an in-band signal; and
   when a sequence of samples consistent with a leading portion of an in-band signal is identified,
      introducing a delay in transmission of said stream of digital audio samples while verifying the presence or absence of said in-band signal.

20. A method of transmitting digital audio signals, said method comprising the steps of:
   scanning an audio stream for consistency with a leading portion of an in-band signal; and
   upon detection of a leading portion of an in-band signal within said incoming audio stream,
      digitally delaying said audio stream while verifying the presence or absence of said in-band signal.

21. A method of transmitting digital audio signals, said method comprising the steps of:
   scanning a stream of digital audio samples for consistency with a leading portion of an in-band signal;
   dividing said stream of digital audio samples into a sequence of input frames of digital audio samples;
   encoding each of said input frames, thereby producing a sequence of encoded audio frames; and
   transmitting each of said encoded audio frames at the earliest possible transmission time, unless said scanning step has identified digital audio samples corresponding to that encoded audio frame to be consistent with a portion of an in-band signal at said earliest possible transmission time.

22. The method of claim 21, further comprising the step of skipping said encoding step for an input frame when it is known prior to said encoding step that an encoded audio frame corresponding to that input frame is not needed.

* * * * *